July 23, 1957 — A. LEIBUNDGUT — 2,800,088
RACKING ROD LOADING APPARATUS FOR ALIMENTARY PASTE PRODUCTS
Filed Aug. 13, 1954

INVENTOR
Alfred Leibundgut
BY C. P. Goepel
his ATTORNEY

July 23, 1957 A. LEIBUNDGUT 2,800,088
RACKING ROD LOADING APPARATUS FOR ALIMENTARY PASTE PRODUCTS
Filed Aug. 13, 1954 5 Sheets-Sheet 2

INVENTOR
Alfred Leibundgut
BY C. P. Goepel
his ATTORNEY

July 23, 1957  A. LEIBUNDGUT  2,800,088
RACKING ROD LOADING APPARATUS FOR ALIMENTARY PASTE PRODUCTS
Filed Aug. 13, 1954  5 Sheets-Sheet 3

INVENTOR
Alfred Leibundgut
BY
his ATTORNEY

July 23, 1957 A. LEIBUNDGUT 2,800,088
RACKING ROD LOADING APPARATUS FOR ALIMENTARY PASTE PRODUCTS
Filed Aug. 13, 1954 5 Sheets-Sheet 4

Fig. 16.

INVENTOR
Alfred Leibundgut
BY C. P. Goepel
his ATTORNEY

July 23, 1957   A. LEIBUNDGUT   2,800,088
RACKING ROD LOADING APPARATUS FOR ALIMENTARY PASTE PRODUCTS
Filed Aug. 13, 1954   5 Sheets-Sheet 5

INVENTOR
Alfred Leibundgut
BY C. P. Goepel
his ATTORNEY

United States Patent Office 2,800,088
Patented July 23, 1957

2,800,088

RACKING ROD LOADING APPARATUS FOR ALIMENTARY PASTE PRODUCTS

Alfred Leibundgut, Elgg, Switzerland, assignor to Gebruder Buhler, Uzwil, Switzerland Application August 13, 1954, Serial No. 449,570

Claims priority, application Switzerland June 11, 1954

16 Claims. (Cl. 107—14)

This invention relates to machines for producing long alimentary paste products, such as macaroni or the like, and more particularly to an apparatus for automatically cutting, racking and conveying extruded linear rows of spaced strings onto racking rods without any slipping of the extruded product thereon.

The long alimentary paste products which emerge from the press are racked on rods whereon they remain until the end of the drying process. In known racking rod loading machines the rods are moved against the dough strings and the strings severed close to the extrusion die at a time when the looped string portion above the racking rod is substantially equal to that suspended from the rod. The severed leg of the string then falls by gravity over the rod and both ends of the string are cut off to equal length before the loaded rod is led into the drier. However, due to the insufficient friction between the racking rod and the strings supported thereon, not only single strings but even groups thereof slide during the loading operation causing much waste in extruded product. Several devices have been proposed to prevent such slippage of dough strings on the rods, such as swinging aprons and the like, without however substantially reducing such slippage.

This invention provides an arrangement which overcomes the disadvantages and deficiencies of conventional structures by the provision of a racking rod loading machine wherein an element bears against the dough strings supported by the racking rods and prevents any sliding with respect thereto. In contrast to the known slippage control means, applicant's novel machine provides a member which bears against that portion of the dough strings which surrounds the periphery of the racking rod and not at a distance therefrom. As the slippage control member is of a material chosen with a view not to damage the appearance of the dough strings, being however sufficiently compact to prevent the undesirable slippage, the strings are prevented from any relative movement with respect to the racking rod and both legs of each string may therefore attain equal length.

The invention further provides a novel cutter for the extruded dough strings which cuts the same without deformation. This novel cutting device is supported by a carriage slidable or wheeled, chain-driven in the spreader below the extrusion die and its disc cutters sever the rows of extruded dough strings while moving in opposite directions.

The invention still further provides an electric make-and-break contact system cooperating with the endless conveyor carrying the racking rods against the issued dough strings, said system immediately disconnecting the motor which drives the endless conveyor when a rod is out of position thereon before any damage can occur in the rod loading machine. This make-and-break system is responsive either to a predetermined slackening or a predetermined maximum tension in the endless conveyor, depending upon its position with respect to the rod container.

Still further, the invention provides an apparatus wherein cutting, racking and conveying operations are coordinated in controlled timed relation.

Finally, the invention provides means to change the relative distance between the slippage control means and the racking rods so that the two elements bear against each other before the suspended dough strings are cut below the extruding die, and to separate the two elements thereafter, since the substantially equally long arms of the cut-off dough strings by their approximately equal weight alone prevent any further slippage on the racking rod.

Other objects and advantages of my invention will be pointed out and described with more particularity in the course of the following detailed description of some preferred embodiments thereof, taken in conjunction with the accompanying drawing wherein like reference characters designate similar elements, and the invention will be finally pointed out in the appended claims.

In the accompanying drawing.

Figure 1:
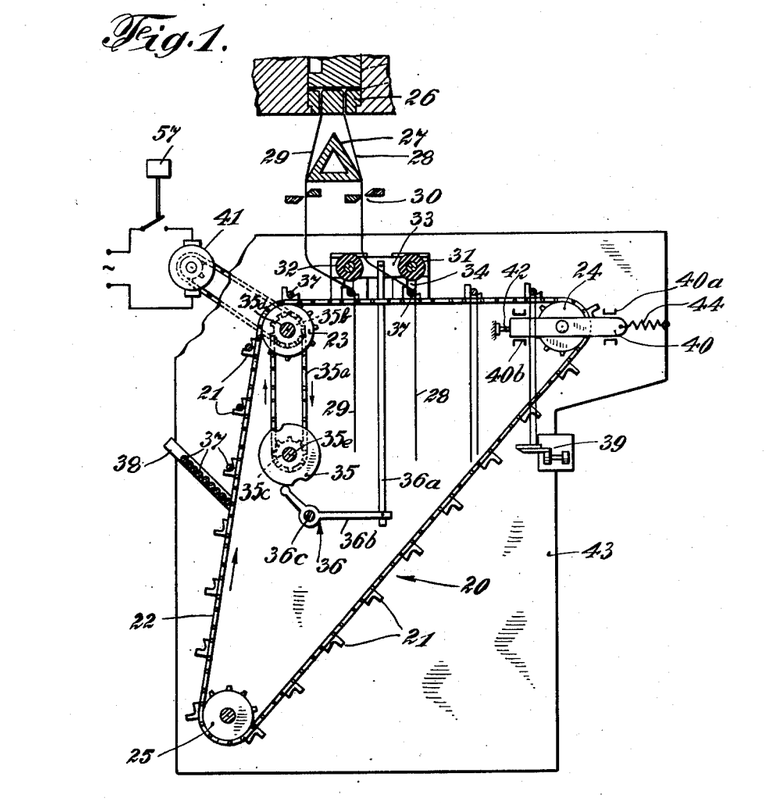
Fig. 1 is a side elevational view in section of the racking rod loading apparatus and of a portion of the extruding die thereabove.

Referring now in more detail to the illustrated embodiments, and more particularly to Fig. 1, there is shown an endless conveyor 20 preferably consisting of two chains or belts 22 which support carrying dogs 21 in parallel spaced relationship. The chains 22 are driven by sprocket 23 and led over guide rolls 24 and 25. The dough is extruded through die 26, the latter forming part of a press for alimentary paste products of any known design and therefore not shown in more detail in Fig. 1. A stationary spreader 27 divides the dough strings into two spaced vertical linear rows 28 and 29. A conventional cutting mechanism is shown schematically at 30, and a novel cutting device in Figs. 14 and 15. Control means, such as the slippage preventing elements 31 and 32 are mounted between two beams 33 which are supported for vertically reciprocating movement in guide block 34.

Cam 35 is rotated from sprocket 23 at a constant rate by means of a chain 35a which travels over sprockets 35b and 35c on shafts 35d, 35e, respectively. Sprockets 23 and 35b are rigidly mounted on shaft 35d, and the cam 35 with sprocket 35c is non-rotatably carried on the lower shaft 35e. The cam 35 effects lifting or lowering of elements 31 and 32 depending on the position of racking rods carried by dogs 21. This reciprocal movement of elements 31 and 32 is caused by levers 36a, 36b, the lever 36b being pivotally supported by a shaft 36c. For example, and as shown, the sprocket 23 has ten teeth. During a period of operation the chain 22 moves for eight links and the sprocket 23 effects eight tenths of a full revolution. The ratio of the chain drive 35a is 10:8, the sprocket 35b having ten teeth and the lower sprocket 35c having eight teeth. Thus, during a period of operation, the cam 35 will make a full revolution.

Rods 37 are stored in an inclined container 38 having a delivery opening so that each dog 21 passing in front of said opening receives a rod during its travel toward the parallel rows of spaced dough strings issued through die 26. A cutting device 39 is provided in the path of the extruded dough strings after they have been loaded onto rods 37 before the same enter the drier which is not shown. This cutter 39 severs both legs of the suspended dough strings to a predetermined length inasmuch as these strings are not of the desired length.

The guide rolls 24 are mounted on slides 40 supported by bearings 40a, 40b. One end of slide 40 is connected to the framework 43 of the machine by spring 44, the force of said spring 44 working against the tension of chains 22 and in normal operation, the tension in chains 22 is sufficient to maintain contacts 42 closed. However, if the tension in the chains 22 is sufficiently reduced for any reason, such as for example by a rod improperly carried by dogs 21, then spring 44 breaks the contact which is included into the electric circuit of driving motor 41, thereby disconnecting said motor and preventing any damage to the mechanism.

Figure 2:
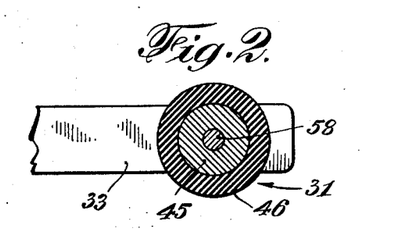
Fig. 2 is a sectional view of one embodiment of the slippage control member.

The number of pressing or control elements 31, 32 depends on the capacity of the extrusion press and also on the dimensions of the rod loading mechanism. One, three or more such elements may be installed, depending on the number of rows of strings extruded through die 26. These elements 31, 32 consist of relatively soft elastic material, such as rubber or any other suitable plastic. In the embodiment illustrated in Fig. 2, element 31 comprises a roll 45 on shaft 58 which is journaled in beams 33. Roll 45 is provided with a soft coating 46 of rubber or the like to obtain a close contact with the dough strings 28. This coating 46 is preferably of a substantial thickness to maintain a close contact with the dough strings carried by rods 37 even when said rods deflect or are bent for any other reason.

Figure 3:
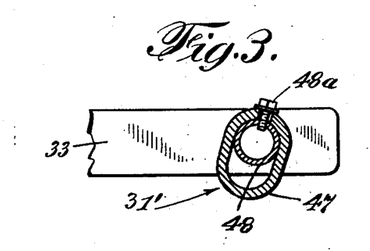
Fig. 3 is a sectional view illustrating another form of the slippage control member.

Fig. 3 illustrates a different embodiment of element 31, herein designated as 31'. This shape of element 31' is particularly advantageous to obtain a close contact with rods 37. As shown, it consists of an elliptical soft-rubber or like member 47 which is eccentrically supported by and secured to a tube 48 by screws 48a. Tube 48 is mounted between beams 33.

Figure 4:
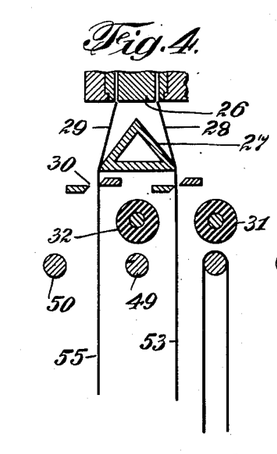
Figs. 4 to 8 illustrate different stages and different relative positions of the slippage control members with respect to the racking rods during loading thereof.

Figs. 4 to 8 illustrate different stages during the operation of the loading mechanism. This loading mechanism is intermittently operated in timed relation to extrusion of linear rows of alimentary paste products through die 26. In Fig. 4, two rows 28, 29 of dough strings extruded through die 26 are separated by stationary spreader 27. This is the initial position for a loading step in the course of which rods 49 and 50 are loaded, each rod with a row of parallel dough strings 28, 29, respectively. Slippage control members 31, 32 are above and to right from rods 49, 50. A loaded rod is shown below member 31.

Figure 5:
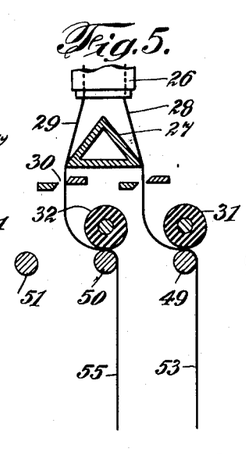

In Fig. 5 the next step is shown, wherein timer 57 (see Fig. 1) has actuated motor 41 to rotate sprocket 23 and to thereby advance rods 49, 50 for a pitch length in a position below members 31, 32 which have descended in the meantime by the action of cam mechanism 35, 36 and came into contact with said rods. Timer 57 actuates motor 41 shortly before the rows 28, 29 of the dough strings have attained the required length. Members 31, 32 press slightly against the transport rods 49, 50 which have been brought directly below said members by the one-pitch-length movement of endless conveyor 22.

Figure 6:
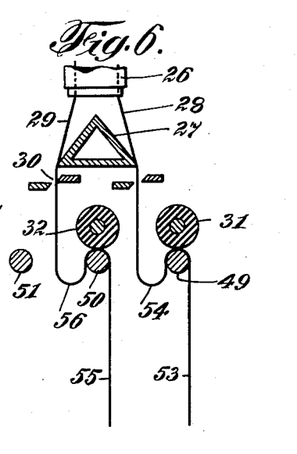
Figure 7:
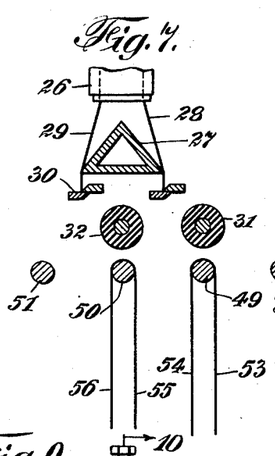
Figure 8:
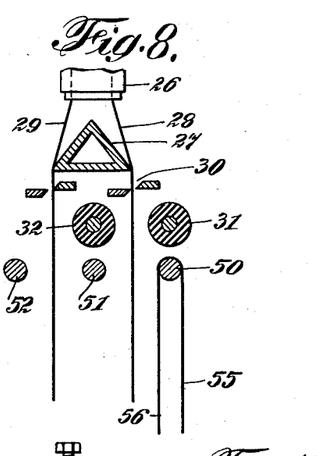

In Fig. 6, a further stage in the racking rod loading process is shown, wherein the extrusion of the dough strings is completed and the upper suspended arm of each dough string 28, 29 forms a loop 54, 56, respectively. In Fig. 7, cutters 30 have severed the upper ends of each row of strings and the strings therefore fall by gravity, but without any displacement relative to rods 49, 50 because of the members 31, 32 which are in contact with said rods and dough strings suspended thereon. In Fig. 7, members 31, 32 have already been lifted above rods 49, 50, i. e. the cutting operation has been terminated and the substantially equal lengths of both suspended portions 53, 54 of threads 28, and 55, 56 of threads 29 prevent any further displacement. The timer 57 then actuates motor 41 to move conveyor 22 for one pitch length before die 26 issues the dough strings sufficiently to have their lower ends reach the plane of travel of racking rods 37 on the conveyor. This is necessary because the next following rod 51 must be brought into a position below member 32 before it comes into contact with the suspended dough strings. The position shown in Fig. 8 is illustrative of a further step identical with that described in connection with Fig. 4, i. e. before the loading of the next two empty rods 51, 52 is started.

The loading of racking rods thus consists of the following steps, reference being had to a loading device co-operating with a press extruding two parallel spaced rows of dough strings:

(a) Bringing an empty rod between two rows of strings directly below one of the slippage control members and the other rod lagging a distance equal to the distance between the two control members;

(b) Extruding the dough strings to a length so that the lowermost ends of said strings are at a distance below the empty racking rods equal to half the length of the dough strings intended to be stored on said rods;

(c) Moving the rods for a pitch length and at the same time lowering the two members so that the first rod contacts the second member thereby preventing the slipping of dough strings on the first rod, and the second rod contacts the first member for the same purpose;

(d) Continuing with the extrusion of dough strings to form a loop in their upper portions which are at their uppermost ends suspended from the extrusion die and at the lower ends held between the racking rod and one of the members;

(e) Severing the upper ends of each string row below the die whereby said upper ends fall by gravity over the rods, their lower ends being substantially at equal length from the supporting racking rods;

(f) Lifting the members and moving the loaded rods for one pitch length to bring two empty rods in the position for loading; and (g) Extruding the dough so that the first empty rod is between two parallel rows of extruded threads.

The succession of the above described steps is only slightly altered when one, three or more rows of dough strings are extruded through the die.

Figure 9:
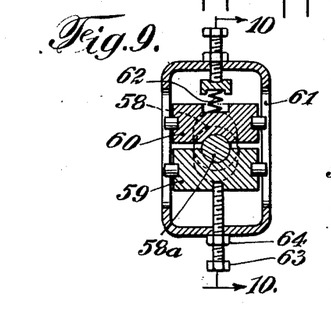
Fig. 9 is a section through the suspension arrangement of a slippage control member which permits raising of said member by the progressing racking rods.
Figure 10:
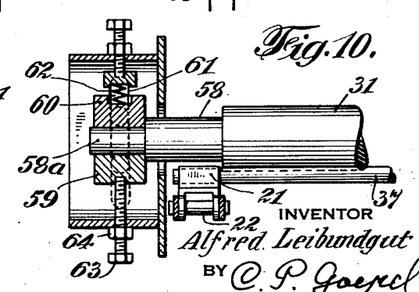
Fig. 10 is a vertical section through Fig. 9 along line 10—10, as viewed in the direction of arrows.

The cam mechanism 35, 36 (see Fig. 1) may be omitted in another embodiment of my invention wherein the racking rods themselves raise the members 31, 32, as illustrated in Figs. 9 and 10. In Fig. 9, reduced end 58a of shaft 58 on which member 31 is mounted, rests in a bearing 59 and is held therein by the upper bearing 60. The upper bearing is vertically movable in a guide 61 in the frame 43 of the machine and is held in contact with shaft 58 by a spring 62. A passing racking rod 37 presses slightly against member 31 and raises it against the pressure of spring 62.

It is also possible to maintain the lower bearing 59 and upper bearing 60 fixed at a constant height. A loaded rod, when passing therebelow, slightly presses against the soft coating on the periphery of the member 31 and rotates the same.

However, in order to adapt the slippage control members to use with dough strings of various thicknesses, it is advantageous to mount members 31, 32 so as to be vertically adjustable with respect to the passing rods. This is accomplished, according to Figs. 9 and 10, by mounting vertically movably also the lower bearing 59 in the vertical guides 61. The height of the lower bearing is determined by screw 63 and a lock nut 64.

Figure 11:
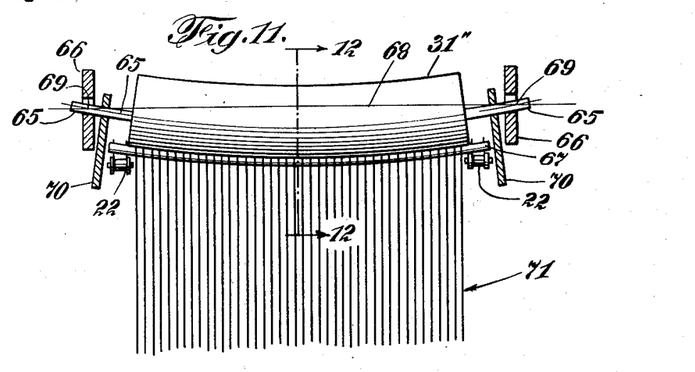
Fig. 11 illustrates a still further embodiment of the slippage control member wherein said member is supported by a bent shaft.
Figure 12:
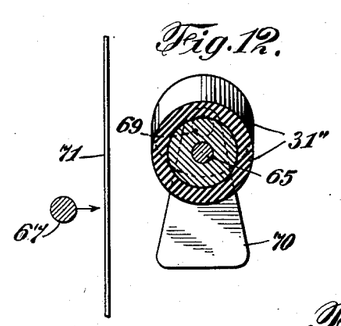
Fig. 12 is an enlarged sectional view through Fig. 11, along line 12—12, before the racking rod and the control member engage each other.
Figure 13:
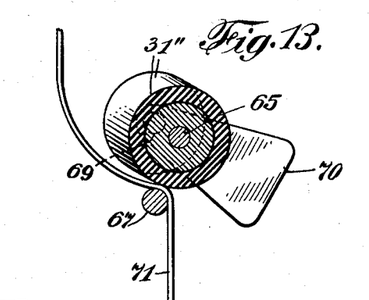
Fig. 13 is a view similar to that shown in Fig. 12, wherein the dough strings carrying rod bears against and displaces the slippage control member.

Another form of a slippage control member 31″ is illustrated in Figs. 11 to 13. In this embodiment, the effect of weights is utilized. Shaft 65 which supports member 31″ is journaled into bearings 66, these bearings being fastened to framework 43 of the machine. In accordance with the deflection of a loaded racking rod 67, the member 31″ is slightly curved so that its center of gravity is below the straight line 68 connecting the two journaled ends 69 of shaft 65. To increase the eccentricity of member 31″, weights 70 are suspended on shaft 65 and secured thereto.

As shown in Fig. 12 which is a vertical section through Fig. 11, an empty rod 67 travels toward the member 31″ and abuts and carries with it a row of extruded dough strings 71. When the rod reaches member 31″, it deflects said member out of its initial position to that shown in Fig. 13. The height of member 31″ is so chosen that the rod 67 pushes it out of its position of equilibrium, and since member 31″ is eccentric with respect to the journaled ends of its shaft 65, it presses the dough strings against rod 67.

As hereinbefore mentioned, it may occur that the rod container 38 (see Fig. 1) is not filled correctly and therefore will not emit rods 37 in proper position onto dogs 21 on conveyor 22. This may lead to jamming of transport rods between container 38 and sprocket 23, whereby serious disturbances and even breakage of a transport rod may occur, which is especially dangerous when the transport rods are made of a metal. To prevent such jamming, switches 42 are provided which disconnect the motor 41 immediately when the tension in conveyor 20 has reached either a predetermined maximum or a predetermined minimum value, depending on the location of said contacts. In Fig. 1, switches 42 are mounted to cooperate with guide rolls 24, i. e. they are mounted after the driving sprockets 23. When a rod jams between container 38 and sprockets 23, the tension in the remaining portion of conveyor 22 is reduced and the conveyor slackens accordingly. Spring 44 then forces guide rolls 24 in a direction to right and contacts 42 are interrupted whereby motor 41 stops immediately.

Figures 17, 18:
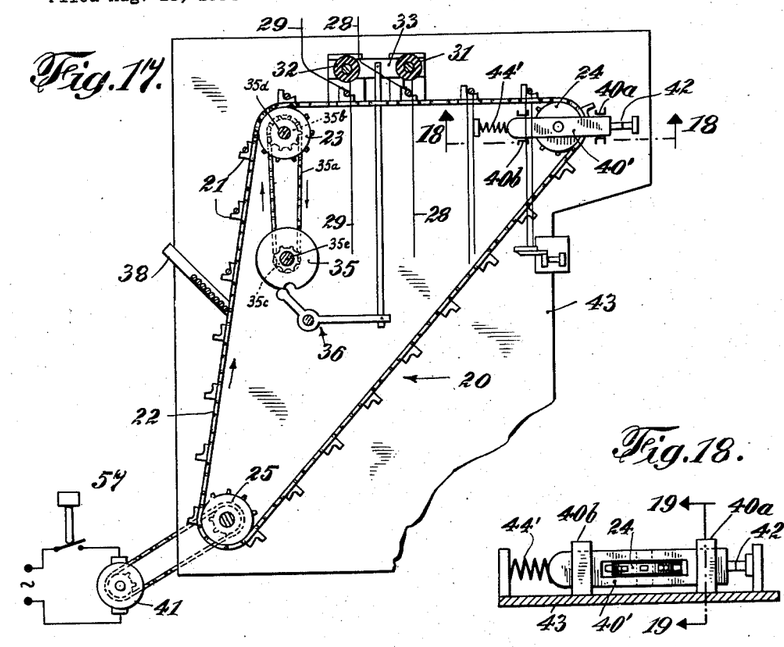
Fig. 17 is an illustration similar to that of Fig. 1, with the conveyor motor connected to a different sprocket.
Fig. 18 is an enlarged detail view of the slide shown in Fig. 17, as viewed in the direction of arrows from line 18—18 in Fig. 17.
Figure 19:
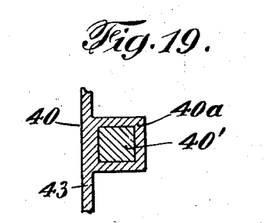
Fig. 19 is a section taken on line 19—19 in Fig. 18.

If sprockets 25 are driving instead of sprockets 23, then switches 42 are arranged differently in order to be responsive to a predetermined maximum tension in conveyor 22, as shown in Figs. 17 to 19.

In Fig. 17, switch 42 is mounted before the driving sprocket 25 and is responsive to a predetermined maximum tension in the conveyor 20. During normal operation of the apparatus, spring 44′ maintains contacts 42 closed by urging slides 40′ toward right. If a racking rod jams between the dispenser 38 and sprocket 24, the tension increases and spring 44′ yields to break the contacts 42 (see Fig. 16) and stop the motor 41.

Fig. 18 is an enlarged detail view of the slide 40′, switch 42 and spring 44′, with chain 20 removed; and Fig. 19 illustrates in section the square contour of slide 40′.

Figures 14, 15:
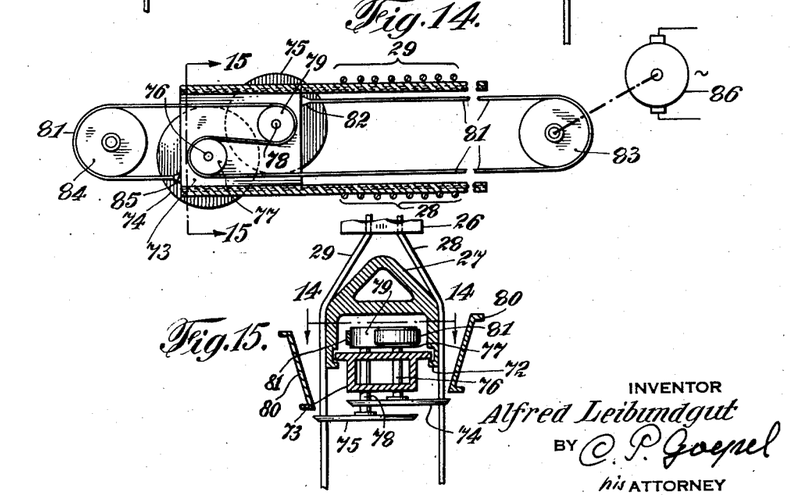
Fig. 14 shows the novel cutting devices for the dough strings in plan view, as seen in the direction of arrows in Fig. 15, along line 14—14.
Fig. 15 is a vertical section along line 15—15 in Fig. 14.
Figure 20:
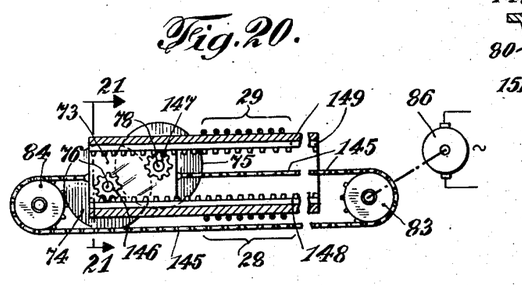
Fig. 20 is a view similar to that of Fig. 14, showing a chain drive for the dough cutters.
Figure 21:
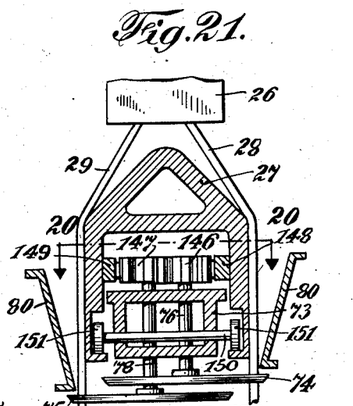
Fig. 21 is a section taken on line 21—21 in Fig. 20.

The severing of the extruded dough strings below the die has always been a grave problem. Several systems have been devised for cutting device 30 in an effort to secure a neat cut without large deformation of the paste products, especially the hollow dough strings. My invention provides a novel cutter which is illustrated in Figs. 14 and 15, and a modification thereof is shown in Figs. 20 and 21. Fig. 14 is a plan view as seen in the direction of arrows on line 14—14 in Fig. 15, and Fig. 15 is a vertical section therethrough along line 15—15. As seen in Fig. 15, guides 72 are arranged in the spreader 27 and a carirage 73 is movable from one side of the machine to the other in said guides in a direction parallel to the extruded rows of dough strings. Disc cutters 74 are provided to sever row 28 and disc cutters 75 for row 29. These disc cutters are mounted on the carriage 73. A roller 77 is mounted on shaft 76 of disc cutter 74, and another roller 79 is mounted on shaft 78 of cutter 75. Guides 80 bring the dough strings into the path of disc cutters 74 and 75. As better seen in Fig. 14, a belt 81 is attached to the carriage 73 at 82, is then reversed by a pulley 83, said pulley being rotatably mounted in the framework 43 of the machine, and the belt is then led around rollers 77, 79 in a manner to cause movement of disc cutters 74, 75 in opposite directions when belt 81 is moved. Said belt is then reversed by pulley 84 rotatably mounted on the opposite side of the machine frame 43 and secured to carriage 73 at 85. A motor 86 drives pulley 83 and moves carriage 73 rapidly from one side of the machine to the other and simultaneously rotates cutters 74, 75. During the next cutting operation, motor 86 rotates in the opposite direction to guide carriage 73 also in the direction opposite to the previous movement.

Carriage 73 may also be mounted on wheels and be moved by chains or the like, as shown in Figs. 20 and 21. In Fig. 20, the carriage 73 is driven by means of a chain 145. A gear wheel 146 is fastened on the shaft 76 of cutter 74, and a second gear wheel 147 is secured to the shaft 78 of cutter 75. When the carriage 73 moves, gear wheels 146, 147 mesh with racks 148, 149 which are fastened to the machine in such a manner that the disc cutters 74, 75 rotate in opposite directions. Carriage 73 is mounted on axles 150 provided with wheels 151 (see Fig. 21).

It may be seen from the above description that a fully automatic racking rod loading and conveying mechanism has been provided which is highly sanitary and the suspended dough strings are prevented from longitudinal slippage by the pressing elements, thus rendering the racking operation also highly economical by reducing the waste to a minimum. The novel cutting means and motor control mechanism further increase the efficiency and economy of the operation without deformation of the extruded product.

Figure 16:
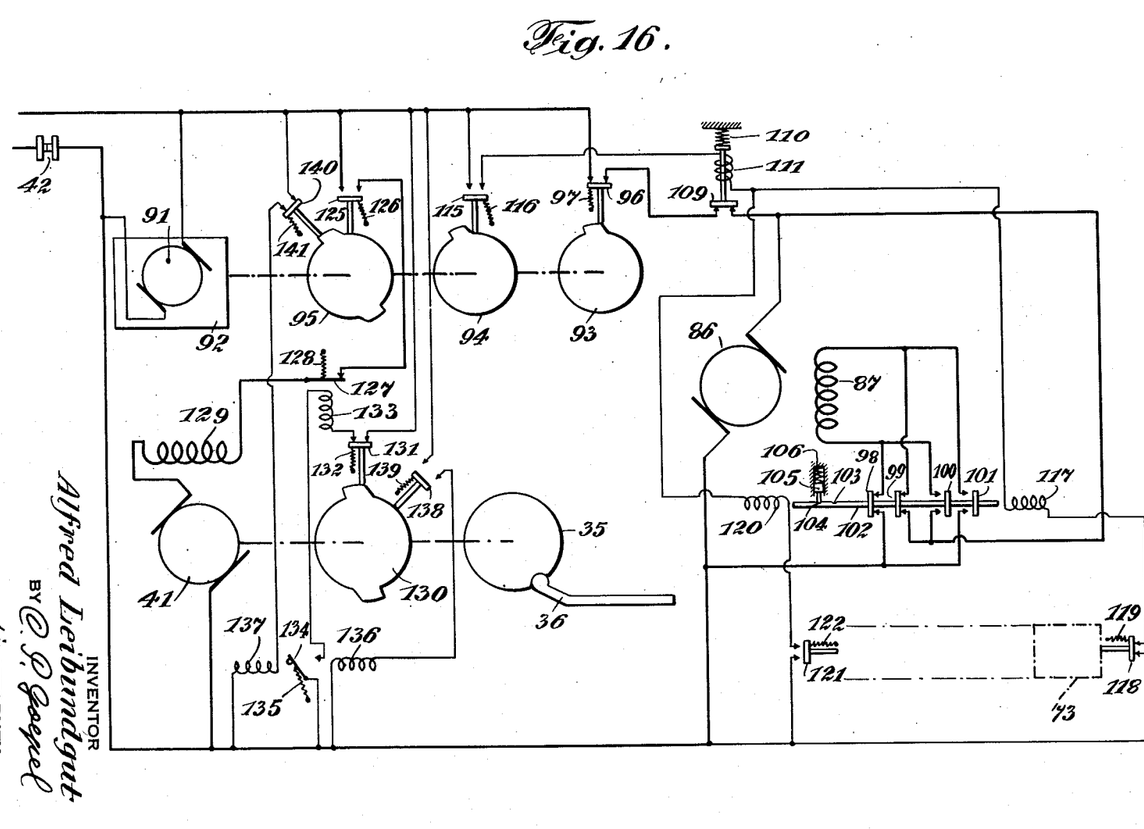
Fig. 16 is a schematic representation of the wiring of the apparatus, including the timer mechanism, conveyor motor and cutter motor.

The control mechanism including the timer 57, motor 41, switch 42, cam 35 and linkage 36 (see Fig. 1), combined with the motor 86 of the cutting device (see Figs. 14, 15, 20, 21) is schematically shown in Fig. 16.

The timer 57 includes a motor 91 driving, over a stepless gear 92, three relatively slowly rotating cams 93, 94, 95.

Cam 93 controls a switch 96 normally maintained open by a spring 97. This switch 96 is in the circuit of motor 86 which actuates the carriage 73 of cutters 74, 75. The flow of current in the field coil 87 of motor 86 is controlled by four switches 98—101, actuated by a rod 102 provided with a pair of notches 103, 104, alternately receiving an indexing element 105 urged against rod 102 by a spring 106. Switch 109 in the conduit to motor 86 and field coil 87 is normally closed by a spring 110, but opens when a coil 111 is energized.

Cam 94 controls a switch 115 which is normally open by the action of a spring 116. The circuit of switch 115 includes the coil 111, a coil 117 for axially moving rod 102 to right, and an end switch 118, normally held open by a spring 119, and closed by the carriage 73 in its extreme right position. In parallel with coil 117 and switch 118, there are connected a coil 120 for moving rod 102 toward left, and an end switch 121 normally maintained open by a spring 122, and closed by the carriage 73 in its extreme left position.

Cam 95 actuates a switch 125 which is normally maintained open by a spring 126. Switch 125 controls the circuit of motor 41 driving the conveyor chains 22. A switch 127, the field coil 129 and the rotor of motor 41 are connected in series with the switch 125. Switch 127 is normally maintained closed by a spring 128. Motor 41 drives cam 35 which controls the vertically oscillating movement of pressing elements 31, 32, and also a cam 130 which actuates the switch 131, the latter being normally maintained open by a spring 132. Switch 131 is in series with a coil 133 which, when energized, opens switch 127. A switch 134, maintained either in open or closed position by a spring 135, is installed in series with switch 131 and coil 133. For closing the switch 134, a coil 136 is provided which is energized when a switch 138 is closed by the cam 130, driven by motor 41. The switch 138 is normally maintained open by a spring 139. The coil 137, energized when a switch 140 is closed by cam 95, opens switch 134. Switch 140 is normally maintained open by a spring 141.

The switch 42 is shown in one of the leads to the motor 41 to stop said motor when the chains 22 are unduly slack or under undue tension.

The position of the above elements shown in Fig. 16 corresponds to that of Fig. 6, i. e., when the extruded dough strings have reached the required length and are about to be cut at their upper ends. The relatively slowly but continuously rotating cam 93 then closes switch 96 and current flows through motor 86, switch 98, field coil 87 and switch 99. Motor 86 rotates and carriage 73 begins its stroke, enabling spring 119 to open the switch 118. Cam 94 then closes switch 115 without result since both switches 118 and 121 are open. When the carriage 73 reaches the other side of the machine, it closes switch 121 and the current flows through switch 115, coil 111, coil 120 and switch 121. Due to the energization of the coil 111, switch 109 opens and motor 86 stops. The energized coil 120 causes rod 102 to move to the left, opening switches 98, 99 and closing switches 100, 101. During the subsequent stroke of the carriage 73, current will flow through field coil 87 in the opposite direction and the direction of rotation of motor 86 is reversed.

In the meantime, switch 140, controlled by cam 95, has opened, but switch 134, controlled by spring 135, still remains open. After the carriage 73 reaches the other end of the machine, cam 95 closes the switch 125 and since switch 127 is closed, current flows through field coil 129 and motor 41 which consequently rotates. Cam 35 then displaces the lever 36 which raises pressing elements 31, 32 and moves said elements away from rods 49, 50 (see Fig. 7). The rotating cam 130 first permits switch 131 to open by the action of spring 132, and then closes the switch 138 to energize coil 136 which closes switch 134, with the switch 131 still remaining open. On further rotation of the cam 130, switch 138 opens again. On half a turn of the cam 130, racking rods are moved for a pitch length (see Fig. 4 or 8) and switch 131 closes again. Current flows through switch 131, coil 133 and switch 134, whereby coil 133 is energized and opens the switch 127 to stop the motor 41 and cams 130, 35.

The motor 91 of timer 57 rotates continuously and causes cams 93—95 to rotate. Switch 125, controlled by the cam 95, opens, but no change occurs as the motor 41 has already stopped. The switch 140, also controlled by cam 95, then closes and energizes the coil 137 which opens the switch 134 to deenergize coil 133 and to permit switch 127 to close by the action of the spring 128. However, the motor 41 still remains idle as switch 125, controlled by the cam 95, is still open. On closing of said switch 125, the motor 41 rotates together with the cam 130 which permits the switch 131 to open and closes the switch 138 to energize the coil 136 which in turn closes the switch 134, while the switch 131 remains open. On further rotation of the cam 130, switch 138 opens and when the cam has completed a half turn, the racking rods are transported for a pitch length and the lever 36 enters the notch of the cam 35 bringing the pressing elements 31, 32 into contact with two racking rods. Switch 131 is then closed by the rotating cam 130 and the motor 41 stops due to the energization of the coil 133 and consequent opening of the switch 127. As the cams 93—95 of timer 57 slowly rotate, the switch 125 is opened, the switch 140 closes and energizes the coil 137 to open the switch 134. The cams 93—95 return into the position shown in Fig. 16 and the above-described sequence of steps is repeated with the exception that, as the direction of the current in the field coil 87 is reversed, the motor 86 will rotate in the opposite direction and the carriage 73 will travel from left to right.

The above-described system is employed in the embodiment of Figs. 1 and 4–8. When pressing elements, mounted as those shown in Figs. 9, 10 and 11–13 are used, the cam 35 and the lever 36 are omitted since these pressing elements are permanently in the path of oncoming racking rods and are rocked, rotated or lifted by the same. Also, when conventional cutters, such as those illustrated in Figs. 4–8 are employed, i. e., without the novel device illustrated in Figs. 14–15 and 20–21, they may be mechanically connected by any conventional linkage, for example such as that shown in the U. S. Patent No. 2,208,900 to Giezendanner.

While it is believed that the above detailed description of some preferred embodiments of my invention will enable men skilled in the art to practice the same, I desire it to be clearly understood that the invention is in no way limited to the described and illustrated embodiments, but solely by the scope of the appended claims.

What is claimed is:

1. In an apparatus for producing long alimentary paste products having die means for continuously extruding parallel rows of dough strings, stationary spreader means, a first cutting means in the proximity of said die means for cutting off the trailing ends of extruded dough strings and a second cutting means for trimming to equal length the ends of suspended dough strings, in combination: a racking rod loading apparatus including an endless conveyor, drive means for said conveyor, a racking rod dispenser, means on said conveyor for continuously receiving racking rods from said dispenser and for carrying racking rods toward said rows of extruded dough strings whereby to loop the trailing ends of said strings, a pressing element for each row of extruded dough strings at least partially in the path of the racking rods when said rods engage said strings, each of said pressing elements having an elongated body with a peripheral layer of resilient material, means for actuating said drive means and said first cutting means, and control elements for coordinately timing the operation of said conveyor, said pressing elements and said first cutting means.

2. The combination of claim 1, wherein each of said pressing elements includes a shaft and an elongated tubular body of resilient material attached to said shaft.

3. In an apparatus for producing long alimentary paste products having die means for continuously extruding parallel rows of dough strings, stationary spreader means, a first cutting means in the proximity of said die means for cutting off the trailing ends of extruded dough strings and a second cutting means for trimming to equal length the ends of suspended dough strings, in combination: a racking rod loading apparatus including an endless conveyor, drive means for said conveyor, a racking rod dispenser, means on said conveyor for continuously receiving racking rods from said dispenser and for carrying racking rods toward said rows of extruded dough strings whereby to loop the trailing ends of said strings between said racking rods and said die means, a pressing element for each row of extruded dough strings at least partially in the path of the racking rods when said rods engage said strings, each of said pressing elements having a shaft and an elongated body with a peripheral layer of resilient material, means for actuating said drive means step-by-step at predetermined time intervals and for actuating said first cutting means when said drive means is idle, and control elements for coordinately timing the operation of said conveyor, said pressing elements and said first cutting means.

4. In an apparatus for producing long alimentary paste products having die means for continuously extruding parallel rows of dough strings, stationary spreader means, a first cutting means in the proximity of said die means for cutting off the trailing ends of extruded dough strings and a second cutting means for trimming to equal length the ends of suspended dough strings, in combination: a racking rod loading apparatus including an endless conveyor, drive means for said conveyor, a racking rod dispenser, means on said conveyor for continuously receiving racking rods from said dispenser and for carrying racking rods toward said rows of extruded dough strings whereby to loop the trailing ends of said strings between said die means and said rods, a pressing element for each row of extruded dough strings at least partially in the path of the racking rods when said rods engage said strings for preventing slippage of said strings while engaged by said rods, each of said pressing elements having an elongated body with a peating said drive means, a second motor for actuating said first cutting means, and control elements for ripheral layer of resilient material, a first motor for actucoordinately timing the operation of said motors, whereby to move racking rods on said conveyor step-by-step toward and against said extruded dough strings and to cut off the trailing ends of said strings while engaged by said rods and said pressing elements, and while said first motor is idle.

5. In an apparatus for producing long alimentary paste products having die means for continuously extruding parallel rows of dough strings, stationary spreader means, a first cutting means in the proximity of said die means for cutting off the trailing ends of extruded dough strings and a second cutting means for trimming to equal length the ends of suspended dough strings, in combination: a racking rod loading apparatus including an endless conveyor, drive means for said conveyor, a racking rod dispenser, means on said conveyor for continuously receiving racking rods from said dispenser and for carrying racking rods toward said rows of extruded dough strings whereby to loop the trailing ends of said strings, a pressing element for each row of extruded dough strings at least partially in the path of the racking rods when said rods engage said strings, each of said pressing elements having a shaft and an elongated body with a peripheral layer of resilient material, a pair of motors for actuating said drive means and said first cutting means, means operatively connected with said drive motor for controlling the tension of said conveyor, including a slide, a roller engaging said conveyor and rotatably supported by said slide, a make-and-break contact attached to one extremity of said slide, and a resilient element attached to the other extremity of said slide, and control elements for coordinately timing the operation of said motors.

6. In an apparatus for producing long alimentary paste products having die means for continuously extruding parallel rows of dough strings, spreader means, and means for trimming to equal length the ends of suspended dough strings, in combination: a racking rod loading apparatus including an endless conveyor, a racking rod dispenser, means on said conveyor for continuously receiving racking rods from said dispenser and for carrying racking rods toward said rows of extruded dough strings whereby to loop the trailing ends of said strings between said die means and said rods, a pressing element for each row of extruded dough strings at least partially in the path of the racking rods when said rods engage said strings, each of said pressing elements having an elongated body with a peripheral layer of resilient material, means for actuating said drive means, cutting means including a rotating disc cutter for each row of extruded dough strings mounted below said die means, means for rotating and reciprocally moving said cutters whereby to cut off the trailing ends of the extruded dough strings when said racking rods engage said strings together with said pressing elements, and control elements for coordinately timing the operation of said conveyor, said pressing elements and said cutting means.

7. The structure of claim 6, wherein said disc cutters are mounted in a carriage, said carriage being supported by said spreader for reciprocal movement along said parallel rows of dough strings, and a motor is provided for moving said carriage with said cutters and operatively connected with said control elements.

8. In an apparatus for producing long alimentary paste products having die means for continuously extruding parallel rows of dough strings, spreader means, a first cutting means in the proximity of said die means for cutting off the trailing ends of extruded dough strings and a second cutting means for trimming to equal length the ends of suspended dough strings, in combination: a racking rod loading apparatus including an endless conveyor, drive means for said conveyor, a racking rod dispenser, means on said conveyor for continuously receiving racking rods from said dispenser and for carrying racking rods toward said rows of extruded dough strings whereby to loop the trailing ends of said strings, a pressing element for each row of extruded dough strings at least partially in the path of racking rods when said rods engage said strings, a shaft pivotally supporting each of said pressing elements and substantially conforming to the curvature of the racking rods when said rods are deformed by the dough strings engaged thereby, each of said pressing elements having an elongated body with at least a peripheral layer of resilient material, a plurality of eccentric weights attached to said shaft, means for actuating said drive means and said first cutting means, and control elements for coordinately timing the operation of said conveyor, said pressing elements and said first cutting means.

9. In an apparatus for producing long alimentary paste products having die means for continuously extruding parallel rows of dough strings, spreader means, a first cutting means in the proximity of said die means for cutting off the trailing ends of extruded dough strings and a second cutting means for trimming to equal length the ends of suspended dough strings, in combination: a racking rod loading apparatus including an endless conveyor, drive means for said conveyor, a racking rod dispenser, means on said conveyor for continuously receiving racking rods from said dispenser and for carrying racking rods toward said rows of extruded dough strings whereby to loop the trailing ends of said strings, a pressing element for each row of extruded dough strings at least partially in the path of the racking rods when said rods engage said strings, each of said pressing elements having a shaft, an elongated body with a peripheral layer of resilient material, a pair of bearings for each of said pressing elements for rotatably and vertically reciprocally supporting said pressing elements in the path of the racking rods when said rods engage a row of extruded dough strings, means for actuating said drive means and said first cutting means, and control elements for coordinately timing the operation of said conveyor, said pressing elements and said first cutting means.

10. In an apparatus for producing long alimentary paste products having die means for continuously extruding parallel rows of dough strings, stationary spreader means, a first cutting means in the proximity of said die means for cutting off the trailing ends of said strings and a second cutting means for trimming to equal length the ends of suspended dough strings, in combination: a racking rod loading apparatus including an endless conveyor, drive means for said conveyor, a racking rod dispenser, means on said conveyor for continuously receiving racking rods from said dispenser and for carrying racking rods toward said rows of extruded dough strings whereby to loop the tailing ends of said strings, a pressing element for each row of extruded dough strings at least partially in the path of the racking rods when said rods engage said strings, each of said pressing elements having an elongated body with a peripheral layer of resilient material, cam means operatively connected with said pressing elements for reciprocally moving said pressing elements into and away from the path of said racking rods while said rods engage the rows of extruded dough strings, means for actuating said drive means, said cam means and said first cutting means, and control elements for coordinately timing the operation of said conveyor, said cam means and said first cutting means.

11. In an apparatus for producing long alimentary paste products having die means for continuously extruding parallel rows of dough strings, spreader means and means for trimming to equal length the ends of suspended dough strings, in combination: a racking rod loading apparatus including an endless conveyor, drive means for said conveyor, a racking rod dispenser, means on said conveyor for continuously receiving racking rods from said dispenser and for carrying racking rods toward said rows of extruded dough strings whereby to loop the trailing ends of said strings between said die means and said rods, a means for cutting the trailing ends of extruded dough strings below said die means including a carriage reciprocally supported by said spreader means, disc cutters attached to said carriage, a cutter motor operatively connected with said cutters and with said carriage for moving said carriage along said rows of extruded dough strings and for rotating said cutters, and a connection between said cutters for alternately rotating said cutters in opposite directions, a pressing element for each row of extruded dough strings at least partially in the path of the racking rods when said rods engage said strings for preventing sliding of extruded dough strings on said rods, each of said pressing elements having an elongated shaft substantially conforming in length and curvature to the length and curvature of a racking rod while said racking rod engages a row of extruded dough strings, and an elongated body with at least a peripheral layer of resilient material, means for actuating said drive means including a conveyor motor, and control elements for coordinately timing the operation of said motors including make-and-break contacts responsive to a predetermined tension in said conveyor, said make-and-break contacts being in the circuit of said conveyor motor.

12. As a novel element in a racking rod loading apparatus associated with a press for extruding parallel rows of dough strings, having a conveyor, a racking rod dispenser and means for engaging and carrying racking rods against the parallel rows of extruded dough strings, a pressing element for engaging and returning dough strings against racking rods, including an elongated shaft and a peripheral layer of resilient material surrounding said shaft.

13. The structure defined in claim 12, wherein said layer of resilient material is a hollow tube.

14. The pressing element according to claim 12, wherein a pair of bearings is provided at the extremities of said shaft for vertically reciprocally and rotatably supporting said shaft and said resilient material.

15. The pressing element according to claim 12, wherein said shaft is slightly curved and a plurality of eccentric weights is attached thereto, and bearings are provided for rotatably receiving the extremities of said shaft.

16. The pressing element according to claim 12, and a cam member articulately connected with said shaft for intermittently moving said pressing element into and away from engagement with the racking rods.

References Cited in the file of this patent
UNITED STATES PATENTS

| | | |
|---|---|---|
| 1,627,297 | Surico | May 3, 1927 |
| 2,208,900 | Giezendanner | July 23, 1940 |
| 2,223,352 | De Francisci | Dec. 3, 1940 |